United States Patent [19]

Lösel

[11] Patent Number: 5,318,672
[45] Date of Patent: Jun. 7, 1994

[54] METHOD AND APPARATUS FOR HEATING A LOW-TEMPERATURE-CARBONIZATION DRUM

[75] Inventor: Georg Lösel, Uttenreuth, Fed. Rep. of Germany

[73] Assignee: Siemens Aktiengesellschaft, Munich, Fed. Rep. of Germany

[21] Appl. No.: 832,692

[22] Filed: Feb. 7, 1992

[30] Foreign Application Priority Data

Feb. 7, 1991 [DE] Fed. Rep. of Germany ....... 4103605

[51] Int. Cl.$^5$ .................... C10B 1/00; C10B 47/30; C10B 57/14
[52] U.S. Cl. ...................... 201/10; 201/32; 201/43; 202/105; 202/137
[58] Field of Search ............... 202/87, 105, 106, 124, 202/137, 138, 145, 270; 165/103, 108, 104.11, 104.28; 432/219, 221, 223; 201/15, 43, 27, 10, 32

[56] References Cited

U.S. PATENT DOCUMENTS

| | | | |
|---|---|---|---|
| 2,788,264 | 4/1957 | Bremer et al. | 165/35 |
| 3,400,249 | 9/1968 | Mekjean et al. | 165/104.11 |
| 4,589,354 | 5/1986 | Faehnle | 110/246 |
| 4,734,165 | 3/1988 | Bauer et al. | 201/43 |

FOREIGN PATENT DOCUMENTS

| | | |
|---|---|---|
| 0302310 | 2/1989 | European Pat. Off. . |
| 0340537 | 11/1989 | European Pat. Off. . |
| 2128775 | 12/1971 | Fed. Rep. of Germany . |
| 3815187 | 11/1989 | Fed. Rep. of Germany . |

Primary Examiner—Joye L. Woodard
Attorney, Agent, or Firm—Herbert L. Lerner; Laurence A. Greenberg

[57] ABSTRACT

A method and an apparatus for heating a carbonization drum is especially used for heating a carbonization drum for a low-temperature-carbonization combustion process. Heating gas heated in a heat exchanger is guided in a heating gas loop from the heat exchanger through the carbonization drum. A heat sink is provided for cooling the heating gas. In order to control an energy supply to the carbonization drum, the heating gas is guided back again at least partially and in a controlled fashion through a bypass line, in which the heat sink is disposed, to the heat exchanger, while bypassing the carbonization drum. The heating gas can also be delivered partially and in a controlled fashion through the heat sink to the carbonization drum. A distribution of the heating gas into a maximum of three paths is ensured by a configuration of lines and control devices.

10 Claims, 1 Drawing Sheet

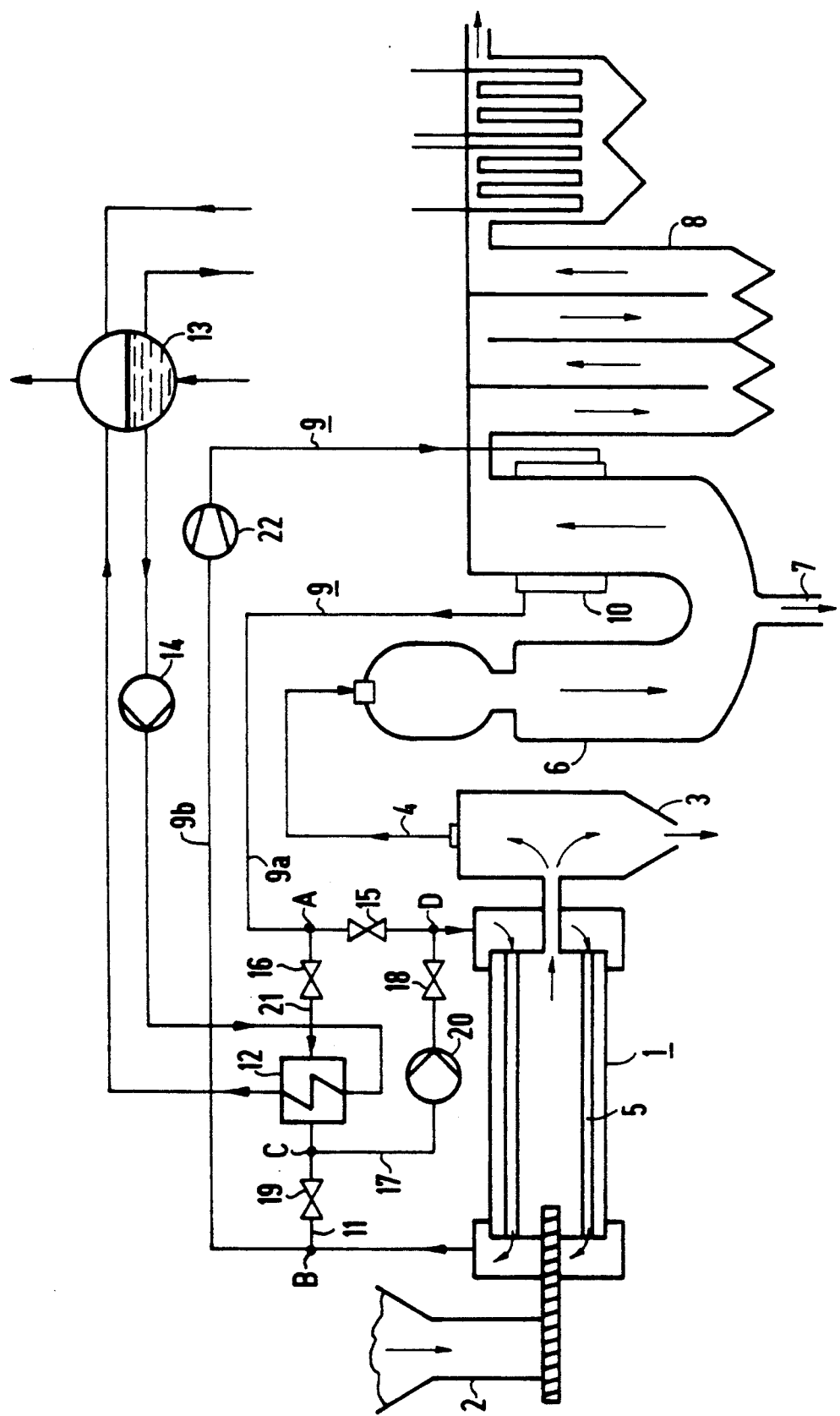

METHOD AND APPARATUS FOR HEATING A LOW-TEMPERATURE-CARBONIZATION DRUM

BACKGROUND OF THE INVENTION

1. Field of the Invention

The invention relates to a method for heating a low-temperature-carbonization drum, in particular a carbonization drum for a low-temperature-carbonization combustion process, in which heating gas that is heated in a heat exchanger is carried in a heating gas loop from the heat exchanger to the carbonization drum and from there back to the heat exchanger, and in which there is a heat sink for cooling down the heating gas. The invention also relates to an apparatus for heating a carbonization drum, particularly a carbonization drum for the low-temperature-carbonization combustion process, which is disposed together with a heat exchanger in a heating gas loop for heating gas, and which communicates there with a heating gas feed line and a heating gas outlet line, with a heat sink being provided for cooling down the heating gas.

2. Description of the Related Art

Published European Application No. 0 302 310 A1, corresponding to U.S. Pat. No. 4,878,440, discloses a method and a system for thermal waste disposal. The system described therein has a carbonization drum, which is referred to as a "pyrolysis reactor". That kind of system is also known from German Published, Non-Prosecuted Application DE 38 15 187 A1. In order to heat the carbonization drum, the drum is supplied with a heating gas. The heating gas is carried in the carbonization drum in tubes. There, it gives up heat energy to the material to be carbonized. A loop in which the heating gas is carried includes a heat exchanger, with which thermal energy is supplied to the heating gas. In a low-temperature carbonization combustion system, the heat exchanger may, for instance, be disposed on the combustion chamber. The heating gas then takes thermal energy from hot flue gas.

The known heating apparatus is constructed for a typical heat requirement in the carbonization drum. For instance, it may be assumed that a calorific value of the material to be carbonized lies between 6500 kJ/kg and 15000 kJ/kg.

If a material with a high calorific value, which is markedly above the typically present calorific value, is to be carbonized, then only little or no heat energy can be drawn from the heating gas in the carbonization drum. That is particularly true if the carbonization drum is driven at full load.

It is also known from German Published, Non-Prosecuted Application DE 38 15 187 A1 to use an additional heat exchanger as a heat sink, in which all of the heating gas is cooled down in the heating gas loop in a direct path between the heat exchanger and the carbonization drum. The additional heat exchanger is regulated on the secondary side, which as a rule is rather expensive. In other words, special heat exchangers are required that can be regulated on the secondary side. Moreover, heating gas that has already flowed through the carbonization drum and has therefore cooled down can be fed directly back into the heating gas line of the carbonization drum so as to lower the heating gas temperature there.

SUMMARY OF THE INVENTION

It is accordingly an object of the invention to provide a method and an apparatus for heating a low-temperature-carbonization drum, which overcome the hereinafore-mentioned disadvantages of the heretofore-known methods and devices of this general type and by means of which overheating of the heating gas can be avoided if the carbonization drum requires less heat energy. The intent is to make do without controlling the secondary loop of the heat sink.

In terms of the method, with the foregoing and other objects in view there is provided, in accordance with the invention, a first basic method for heating a low-temperature-carbonization drum, in particular a carbonization drum for a low-temperature-carbonization combustion process, which comprises heating a heating gas in a heat exchanger, guiding the heating gas in a heating gas loop from the heat exchanger to a low-temperature-carbonization drum and from the carbonization drum back to the heat exchanger, and controlling energy delivered to the carbonization drum by at least partially returning the heating gas through a bypass line having a heat sink for cooling down the heating gas and back to the heat exchanger in a controlled manner, while bypassing or flowing past the carbonization drum.

If all of the heating gas is carried through the bypass, then no heating gas enters the carbonization drum any longer. This course is appropriate if the material to be carbonized requires no supply of heat for a period of time, because it is already quite hot.

It is also possible, however, for the heating gas to be only partly carried through the bypass. In that case, a partial flow of heating gas is carried through the carbonization drum. This partial flow can either reach the carbonization drum directly, or it can first be carried through the heat sink and cooled down there.

In terms of the method, with the objects of the invention in view, there is also provided a second basic method for heating a low-temperature-carbonization drum, in particular a carbonization drum for a low-temperature-carbonization combustion process, which comprises heating a heating gas in a heat exchanger, guiding the heating gas in a heating gas loop from the heat exchanger to a low-temperature-carbonization drum and from the carbonization drum back to the heat exchanger, and cooling down the heating gas in a heat sink, and controlling energy delivered to the carbonization drum by guiding the heating gas partially through the heat sink in a controlled fashion and then at least partially to the carbonization drum in a controlled fashion, and returning the heating gas not delivered to the carbonization drum to the heat exchanger again, while bypassing or flowing past the carbonization drum.

In this version, it is possible to make do without a bypass. The excess thermal energy of the heating gas is discharged solely through the heat sink. All of the heating gas can be delivered to the carbonization drum, after cooling down in the heat sink.

One option according to the invention is for a partial flow of the heating gas to reach the carbonization drum directly, and for another partial flow to reach the carbonization drum through the heat sink. It is also possible for a partial flow to reach the carbonization drum directly through the heat sink and for a further partial flow to flow through the aforementioned bypass. Finally, the heating gas can be split into three partial flows, one of which flows directly to the carbonization drum, a second of which flows through the heat sink to the carbonization drum, and a third of which is carried through the heat sink and the bypass.

With the method of the invention, an advantage which is attained on one hand is that the quantity of heating gas that reaches the carbonization drum can be controlled, and on the other hand that the temperature of the heating gas can be reduced by the heat sink. Through the use of these two mechanisms, which can be used in combination, redundant control of the heat given up by the heating gas to the material to be carbonized in the carbonization drum is achieved. Overheating of the heating gas and thus of the material to be carbonized is precluded, even though the heat taken up by the heating gas in the heat exchanger cannot be reduced, since the flue gas, as a heat carrier, has a constantly high temperature. An advantage which is also attained is that the heat taken up by the heat sink need not be regulated. As a result, the heat sink can be connected on the secondary side with a waste heat steam generator, for instance, that is already present in any case.

With the objects of the invention in view, there is additionally provided a first embodiment of an apparatus for heating a carbonization drum, in particular a carbonization drum for a low-temperature-carbonization combustion process, comprising a heating gas loop for carrying a heating gas, a heat exchanger disposed in the heating gas loop, the heating gas loop having a heating gas feed line and a heating gas outlet line communicating with a carbonization drum to be heated, a first branching point in the heating gas feed line, a bypass line branching off from the heating gas feed line at the first branching point, a heat sink disposed in the bypass line for cooling down the heating gas, control devices each being disposed in a respective one of the heating gas feed line and the bypass line downstream of the first branching point in heating gas flow direction for controlling energy delivered to the carbonization drum, and a second branching point downstream of the carbonization drum in heating gas flow direction at which the bypass line and the heating gas outlet line are united.

With this apparatus it is possible to selectively deliver the entire quantity of heating gas directly to the carbonization drum or to feed it past or in a bypass of the carbonization drum through the bypass line. Moreover, through the use of the control devices, an arbitrarily large partial flow can be carried through the bypass line, while the rest of the heating gas reaches the carbonization drum. This attains an advantage which is that the carbonization drum is supplied with a reduced quantity of heating gas, if less heat energy is needed in the carbonization drum. The partial flow of heating gas carried through the bypass line is cooled down in the heat sink. This is necessary to ensure that an overly high temperature that could impair the heating gas loop will not prevail in the heating gas discharge line.

With the objects of the invention in view, there is furthermore provided a second embodiment of an apparatus for heating a carbonization drum, in particular a carbonization drum for a low-temperature-carbonization combustion process, comprising a heating gas loop for carrying a heating gas, a heat exchanger disposed in the heating gas loop, the heating gas loop having a heating gas feed line and a heating gas outlet line communicating with a carbonization drum to be heated, a first branching point in the heating gas feed line, a delivery line branching off from the heating gas feed line at the first branching point, a heat sink disposed in the delivery line for cooling down the heating gas, control devices each being disposed in a respective one of the heating gas feed line and the delivery line downstream of the first branching point in heating gas flow direction, a fourth branching point disposed downstream of the control device in the heating gas feed line in heating gas flow direction, a discharge line leading from the heat sink to the fourth branching point, and a further control device disposed in the discharge line upstream of the fourth branching point, the control devices controlling energy delivered to the carbonization drum.

With this apparatus it is possible to deliver the heating gas entirely to the carbonization drum either directly or through the heat sink. Through the use of the control devices it is also possible to deliver an arbitrary partial flow of the heating gas directly and the remaining partial flow through the heat sink to the carbonization drum. All of the heating gas always reaches the carbonization drum. However, it is cooled down beforehand in the heat sink either entirely or in part. Accordingly, the carbonization drum can be supplied with a cooled, less-hot heating gas whenever less heat energy is necessary in the carbonization drum. The temperature of the heating gas in the carbonization drum can be controlled according to the invention.

In accordance with another feature of the invention, there is provided a third branching point disposed in the bypass line downstream of the heat sink, a fourth branching point disposed in the heating gas line downstream of the control device disposed in the heating gas feed line, a discharge line having a further control device and leading from the third branching point to the fourth branching point, and an additional control device disposed in the bypass line downstream of the third branching point.

With this combination of the two devices referred to above, it is possible to carry a partial flow of heating gas past the carbonization drum through the heat sink and the bypass line, while the rest of the heating gas also initially flows through the heat sink but then is delivered to the carbonization drum. It is moreover possible to split the heating gas into three partial flows, of which the first partial flow is carried through the heat sink in the bypass line, the second partial flow reaches the carbonization drum through the heat sink, and the third partial flow flows directly to the carbonization drum.

With this apparatus, regulation of the quantity of heating gas that reaches the carbonization drum and regulation of the heating gas temperature in the carbonization drum can be performed separately or combined. This can improve the control of the delivery of energy to the carbonization drum. In accordance with a further feature of the invention, there is provided a blower in the discharge line of the heat sink. This makes it possible to increase the flow speed in the discharge line.

In accordance with an added feature of the invention, the heat sink is an additional heat exchanger or steam generator. The structure of a steam generator is well known. The steam generator can be selectively operated in a forced circulation mode with a pump or in a natural circulation mode without a pump.

In accordance with an additional feature of the invention, the heat sink is an additional heat exchanger or steam generator that communicates on the secondary side with an evaporator system with a waste heat steam generator. This kind of waste heat steam generator may be present in a low-temperature carbonization combustion system. Secondary medium from the steam generator, which takes up heat, is then carried through the waste heat steam generator. Usually the secondary medium is water. It reaches the waste heat steam generator in steam form, with the essential component of the steam generator being a container that is partly filled with water. From there, steam is given up. The container is replenished with water. Some of this water reaches the steam generator, where it evaporates. With the use of an already existing waste heat steam generator in the secondary loop of the additional heat exchanger or steam generator, an advantage is attained which is that no additional devices are needed to dissipate heat from the additional heat exchanger.

In accordance with a concomitant feature of the invention, the heat sink is a cooler, which is acted upon with thermal oil, water or air as a coolant.

With the methods and devices for heating a carbonization drum according to the invention, an advantage is attained which in particular is that the supply of heat to the carbonization drum through the heating gas can be well controlled. Various control mechanisms are available for this purpose. The quantity of heating gas that reaches the carbonization drum and thereby the heating gas temperature of the heating gas delivered to the carbonization drum, can be controlled.

Other features which are considered as characteristic for the invention are set forth in the appended claims.

Although the invention is illustrated and described herein as embodied in a method and an apparatus for heating a low-temperature-carbonization drum, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The drawing is a schematic and diagrammatic circuit diagram of a low-temperature-carbonization and combustion system with devices for controlling energy supply to a carbonization drum.

DESCRIPTION OF THE PREFERRED EMBODIMENT

Referring now to the single FIGURE of the drawing in detail, there is seen a low-temperature-carbonization and combustion system which includes a carbonization drum 1 with a delivery device 2 for waste, a discharge apparatus 3 for pyrolysis residue, and a carbonization gas vent connection 4. Disposed in the carbonization drum 1 are heating tubes 5 that are acted upon by a heating gas. The carbonization gas vent connection 4 communicates with a combustion chamber 6, which has a slag outlet 7 and which is connected upstream of a flue gas cooler 8. The heating tubes 5 in the carbonization drum 1 are part of a heating gas loop 9, which includes a heat exchanger 10 that is in contact with the combustion chamber 6 in this case. Thermal energy from the hot combustion chamber 6 reaches the carbonization drum 5 through the heating gas loop 9 in order to maintain a low-temperature-carbonization process. A compressor 22 is also located in the heating gas loop 9.

In order to adjust, control or regulate the energy delivery to the carbonization drum 1, a bypass 11 branches off from a heating gas feed line 9a to the carbonization drum 1 at a first branching point A. At a second branching point B, the bypass 11 discharges into a heating gas outlet line 9b from the carbonization drum 1. An additional heat exchanger is disposed in the bypass line 11 in the form of a heat sink 12. A steam generator may be provided instead. A first segment of the bypass line 11 between the branching point A and the heat sink 12 serves as a delivery line 21 to the heat sink 12. A cooler may also be used as the heat sink 12. The bypass line 11 communicates with a primary circuit line of the heat sink 12. A secondary circuit line of the heat sink 12 communicates with a waste heat steam generator 13. If forced circulation is to be provided in the secondary circuit or loop, then a recirculating pump 14 is present therein. If there is natural circulation in the secondary circuit or loop, a recirculating pump 14 of this kind is unnecessary. The waste heat steam generator 13 may be a waste heat steam generator that is already present in a low-temperature-carbonization and combustion system for cooling hot flue gas. The waste heat steam generator 13 primarily includes a container that is partly filled with water. Water travels through the secondary loop of the heat sink 12 from the waste heat steam generator 13 to the heat sink 12 and steam travels from the heat sink 12 to the waste heat steam generator 13. There, excess steam is given up, while water is fed in.

In order to control the delivery of heat to the carbonization drum 1, control devices 15, 16 are disposed downstream of the first branching point A in the heating gas feed line 9a and in the bypass line 11. As a result, all of the heating gas flow can be carried to the carbonization drum 1, it can all be carried through the bypass line 11, or it can be distributed to the carbonization drum 1 and the bypass line 11 in an arbitrary ratio.

Downstream of the heat sink 12, a discharge line 17 leaves the bypass line 11 at a third branching point C. At a fourth branching point D downstream of the control device 15, the discharge line enters the heating gas feed line 9a. Since the system can be operated with only the line 21 leading from the first branching point A through the heat sink 12 and the line 17 leading from the heat sink 12 to the branching point D, the branching point D may be considered a second branching point. In order to control the flow of heating gas through the discharge line 17, control devices 18, 19 are disposed in the discharge line 17 and downstream of the third branching point C in the bypass line 11. A blower 20 may also be provided in the discharge line 17.

With the further control device 18 closed and the additional control device 19 open, control of the heating gas throughput through the heating tubes 5 of the carbonization drum 1 is carried out with the control devices 15, 16.

With the control device 19 closed and the control device 18 open, then depending on the position of the control devices 15 and 16, the heating gas can either all be delivered directly to the carbonization drum, or all of it can be delivered to the carbonization drum 1 through the heat sink 12, in which it is cooled down. The heating gas can also reach the heating tubes 5 at an arbitrary ratio, some directly and some through the heat sink 12. As a result, the temperature of the heating gas reaching the heating tubes 5 can be controlled.

If only the control device 15 is closed, then some of the heating gas can be carried through the bypass line 11 and some of it can reach the carbonization drum 1 through the discharge line 17 after cooling in the heat sink 12.

If all of the control devices 15, 16, 18 and 19 are open, the heating gas coming from the heat exchanger 10 can be split over three paths. A first component reaches the heating tubes 5 of the carbonization drum 1 directly. A second component reaches the heating tubes 5 in a cooled down condition, through the heat sink 12 and the discharge line 17. A third portion is returned to the heat exchanger 10, through the heat sink 12 and the bypass line 11, bypassing the carbonization drum 1. The quantitative distribution of the heating gas to the three aforementioned paths is performed by means of the control devices 15, 16, 18 and 19. These devices may be valves.

With the apparatus described above, the delivery of heat to the carbonization drum 1 can be adjusted, controlled or regulated to meet requirements.

I claim:

1. A method for heating a low-temperature-carbonization drum, which comprises:
    heating a heating gas in a heat exchanger, guiding the heating gas in a heating gas loop from the heat exchanger to a low-temperature-carbonization drum and from the carbonization drum back to the heat exchanger, and
    controlling heat delivered to the carbonization drum by at least partially returning the heating gas through a bypass line having a heat sink for cooling down the heating gas back to the heat exchanger in a controlled manner, while bypassing the carbonization drum.

2. A method for heating a low-temperature-carbonization drum, which comprises:
    heating a heating gas in a heat exchanger, guiding the heating gas in a heating gas loop from the heat exchanger to a low-temperature-carbonization drum and from the carbonization drum back to the heat exchanger, and cooling down the heating gas in a heat sink, and controlling heat delivered to the carbonization drum by guiding the heating gas partially through the heat sink in a controlled fashion and then at least partially to the carbonization drum in a controlled fashion, and returning the heating gas not delivered to the carbonization drum to the heat exchanger again, while bypassing the carbonization drum.

3. A carbonization apparatus, comprising a carbonization drum for carrying out a carbonization process, a heating gas loop for carrying a heating gas for heating said carbonization drum, a heat exchanger disposed in said heating gas loop said heating gas loop having a heating gas feed line and a heating gas outlet line communicating with said carbonization drum to be heated, a first branching point in said heating gas feed line, a bypass line branching off from said heating gas feed line at said first branching point, a heat sink disposed in said bypass line for cooling down the heating gas, control means each being disposed in a respective one of said heating gas feed line and said bypass line downstream of said first branching point in heating gas flow direction for controlling heat delivered to said carbonization drum by at least partially returning the heating gas through said bypass line and said heat sink back to said heat exchanger in a controlled manner, while bypassing said carbonization drum, and a second branching point downstream of said carbonization drum in heating gas flow direction at which said bypass line and said heating gas outlet line are united.

4. The apparatus according to claim 3, including a third branching point disposed in said bypass line downstream of said heat sink, a fourth branching point disposed in said heating gas feed line downstream of said control means disposed in said heating gas feed line, a discharge line having a further control means and leading from said third branching point to said fourth branching point, and a additional control means disposed in said bypass line downstream of said third branching point.

5. The apparatus according to claim 4, including a blower disposed in said discharge line.

6. The apparatus according to claim 3, wherein said heat sink is a steam generator.

7. The apparatus according to claim 3, wherein said heat sink is an additional heat exchanger.

8. The apparatus according to claim 3, including a waste heat steam generator having connections, said heat sink being a steam generator having a secondary side communicating with said connections of said waste heat steam generator.

9. The apparatus according to claim 3, including a waste heat steam generator having connections, said heat sink being an additional heat exchanger having a secondary side communicating with said connections of said waste heat steam generator.

10. The apparatus according to claim 3, wherein said heat sink is a cooler being acted upon by a coolant selected from the group consisting of thermal oil, water and air.

* * * * *